US008336062B2

(12) United States Patent
Murakawa

(10) Patent No.: US 8,336,062 B2
(45) Date of Patent: Dec. 18, 2012

(54) ADMINISTRATION DEVICE FOR IMAGE PROCESSING DEVICE USES PLUG-IN APPLICATION

(75) Inventor: Akira Murakawa, Toyonaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1038 days.

(21) Appl. No.: 12/277,702

(22) Filed: Nov. 25, 2008

(65) Prior Publication Data

US 2009/0144758 A1    Jun. 4, 2009

(30) Foreign Application Priority Data

Nov. 29, 2007    (JP) .................................. 2007-308509

(51) Int. Cl.
    *G06F 9/44* (2006.01)
(52) U.S. Cl. ...................................................... 719/328
(58) Field of Classification Search .................. 719/310, 719/328
    See application file for complete search history.

(56) References Cited

U.S. PATENT DOCUMENTS

| | | | |
|---|---|---|---|
| 6,279,016 B1 | 8/2001 | De Vorchik et al. | |
| 6,996,816 B1 * | 2/2006 | Bohan | 717/169 |
| 7,533,155 B2 * | 5/2009 | Kitada | 709/217 |
| 7,821,660 B2 * | 10/2010 | Kitada | 358/1.15 |
| 7,996,490 B2 * | 8/2011 | Kitada | 709/217 |
| 2006/0010422 A1 * | 1/2006 | Reddy et al. | 717/109 |
| 2006/0224686 A1 * | 10/2006 | Kitada | 709/209 |
| 2006/0227367 A1 * | 10/2006 | Kitada | 358/1.15 |
| 2008/0244712 A1 * | 10/2008 | Kitada et al. | 726/5 |

FOREIGN PATENT DOCUMENTS

| | | |
|---|---|---|
| JP | 4-346124 | 12/1992 |
| JP | 5-204615 | 8/1993 |
| JP | 8-286854 | 11/1996 |
| JP | 11-161685 A | 6/1999 |
| JP | 11-184605 | 7/1999 |
| JP | 2002-132512 | 5/2002 |
| JP | 2003-083960 A | 3/2003 |
| JP | 2004-102457 | 4/2004 |
| JP | 2004-334705 | 11/2004 |

OTHER PUBLICATIONS

Notice of Grounds of Rejection dated Oct. 19, 2010, issued in the corresponding Japanese Patent Application No. 2007-308509, and an English Translation thereof.

(Continued)

*Primary Examiner* — Van Nguyen
(74) *Attorney, Agent, or Firm* — Buchanan Ingersoll & Rooney PC

(57) ABSTRACT

When a plug-in application "HDD Backup Utility" is designated by the user from the start menu, an administration program is started. The administration program receives information as to which plug-in application was designated, and based on the received information, places a function button for the designated plug-in application (here, "backup" and "restore" buttons corresponding to HDD Backup Utility) in a "HOME" display area. The user can readily find and select the button in the HOME display area. In this manner, the function button for the designated plug-in application is displayed in the position easily accessible by the user.

17 Claims, 14 Drawing Sheets

OTHER PUBLICATIONS

Notice of Grounds of Rejection issued in corresponding Japanese Patent Application No. 308509/2007 mailed Jan. 5, 2010, and English translation thereof.

Ed Bott et al., "Microsoft Windows Vista Official Manual" pp. 106-135; Sep. 2007.

Ed Bott et al., "Windows Vista Inside Out", pp. 96-122; 2007—English counterpart of "Microsoft Windows Vista Official Manual".

Syuhei Yamada, "Pasokon Katsu-Teku Daihyakka", JP 2007-308509; pp. 1-9, and full English translation—pp. 1-7; Oct. 2000.

* cited by examiner

ADMINISTRATION DEVICE FOR IMAGE PROCESSING DEVICE USES PLUG-IN APPLICATION

This application is based on Japanese Patent Application No. 2007-308509 filed with the Japan Patent Office on Nov. 29, 2007, the entire content of which is hereby incorporated by reference.

BACKGROUND OF THE INVENTION

1. Field of the Invention

The present invention relates to an administration device for an image processing device, and more particularly to an administration device for an image processing device that uses plug-in applications.

2. Description of the Related Art

There is conventionally known a technique of connecting a plurality of image processing devices (such as multi function peripherals (MFPs), facsimile machines, copiers and printers) to a network and controlling them from a personal computer (PC) connected to the network.

In such a PC, an administration program of the image processing device and its plug-in applications are installed. The plug-in applications include backup utility for a hard disk drive (HDD) of the image processing device, authentication/destination/administrator setting utility of the image processing device, log management utility, and the like.

In administration of an image processing device from a PC, an administrator (user) usually performs operations consisting of the following two steps:

(1) Start an administration program to select a device as a target of administration from among a plurality of image processing devices; and (2) Select a function to be executed (or, plug-in application to be executed) in the device selected in (1) above.

Upon implementation of the function for each plug-in application, the device as a target is selected by the administration program. This means that the administration program must be started every time the plug-in application is to be started.

Usually, the administrator selects, from the administration program, a plug-in application to be used (by selecting it from a menu or by selectively operating a corresponding function button). Such selection causes the plug-in application to be started. At the time of startup of the plug-in application, information of the device selected by the administration program is passed to the plug-in application.

Japanese Patent Laid-Open No. 11-161685 discloses a technique for use in filtering a list displayed in a pull-down menu, wherein the filtering rule is changed according to the previously selected content and the content being displayed is changed correspondingly.

Japanese Patent Laid-Open No. 2003-083960 discloses a technique for use in a touch-type operation/input panel, wherein the color of a start button is changed according to the selected measurement mode.

As described above, the administrator selects a device in the administration program before selecting a plug-in application to be started (i.e., a function to be executed).

(1) Problem 1

If an increased number of plug-in applications are added, however, choices (or function buttons) on a menu in the administration program increases, making it difficult for the administrator to find a desired function. If the choices or the function buttons cannot be displayed in one screen, the administrator needs to scroll the screen to find a desired choice or button.

(2) Problem 2

Further, the administrator cannot find which plug-in applications have been installed unless he/she starts the administration program.

(3) Problem 3

Furthermore, each plug-in application may be designated from the start menu or from an icon on the desktop. This causes the administration program to be started. Then, in the administration program thus started, the administrator is required to select a device as a target of administration from among a plurality of image processing devices, and select a function to be executed (or, plug-in application to be executed) on the selected device. Such operations are burdensome for the administrator.

SUMMARY OF THE INVENTION

The present invention has been accomplished in view of the foregoing problems, and an object of the present invention is to provide an administration device for an image processing device that improves operability of plug-in applications.

In order to achieve the above-described object, according to an aspect of the present invention, there is provided an administration device for an image processing device for administrating the image processing device, wherein the administration device includes: an administration program starting unit to start an administration program when a plug-in application of the administration program is designated by a user; an acquiring unit to acquire information for specification of the plug-in application designated by the user; a display unit to display an operation area for allowing the user to select a desired one of a plurality of installed plug-in applications; and a modification unit to modify a user interface for selecting the plug-in application such that the plug-in application designated by the user can readily be selected by the user.

According to this invention, it is possible to provide an administration device for an image processing device that can improve operability of the plug-in applications.

DESCRIPTION OF THE PREFERRED EMBODIMENTS

First Embodiment

An administration program for an image processing device according to a first embodiment of the present invention will now be described. The administration program has the following functions.

The function of administrating a plurality of image processing devices and holding information of the image processing device selected by the administrator.

The function of displaying the function button of an installed plug-in application. When a plurality of plug-in applications are installed, a plurality of function buttons are displayed.

In response to selection of a function button for a plug-in application, the function of starting the plug-in application associated with the selected function button.

At the time of startup of a plug-in application, the function of passing information of the image processing device selected by the administrator, to the application being started.

The function of starting an administration program when a plug-in application is designated from the start menu or from an icon on the desktop. At this time, the administration program obtains the information for specifying the designated plug-in application, and changes the user interface so that the user can readily select the relevant plug-in application. For example, the function button for the designated plug-in application is displayed in a position where the administrator can readily perform the selecting operation, which position may be a "HOME" position.

In this manner, the function button for the designated plug-in application is displayed in the position facilitating the selecting operation so that the function of that plug-in application can be used preferentially, because the plug-in application designated by the administrator from the start menu or the like must be the one he/she wishes to use.

The function of allowing the user to readily start a desired function, by reducing the moving distance of the mouse during the operation or by reducing the number of times of button selecting operations.

Figure 1:
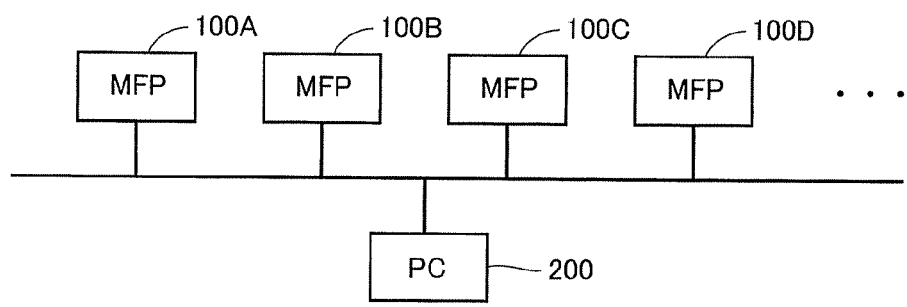
FIG. 1 shows the configuration of an administration system for an image processing device according to an embodiment of the present invention.

FIG. 1 shows the configuration of an administration system for an image processing device according to an embodiment of the present invention.

Referring to FIG. 1, the administration system for the image processing device includes a plurality of MFPs 100A through 100D and an administrator PC 200, which are connected to a network. Administrator PC 200 administrates the MFPs.

Figure 2:
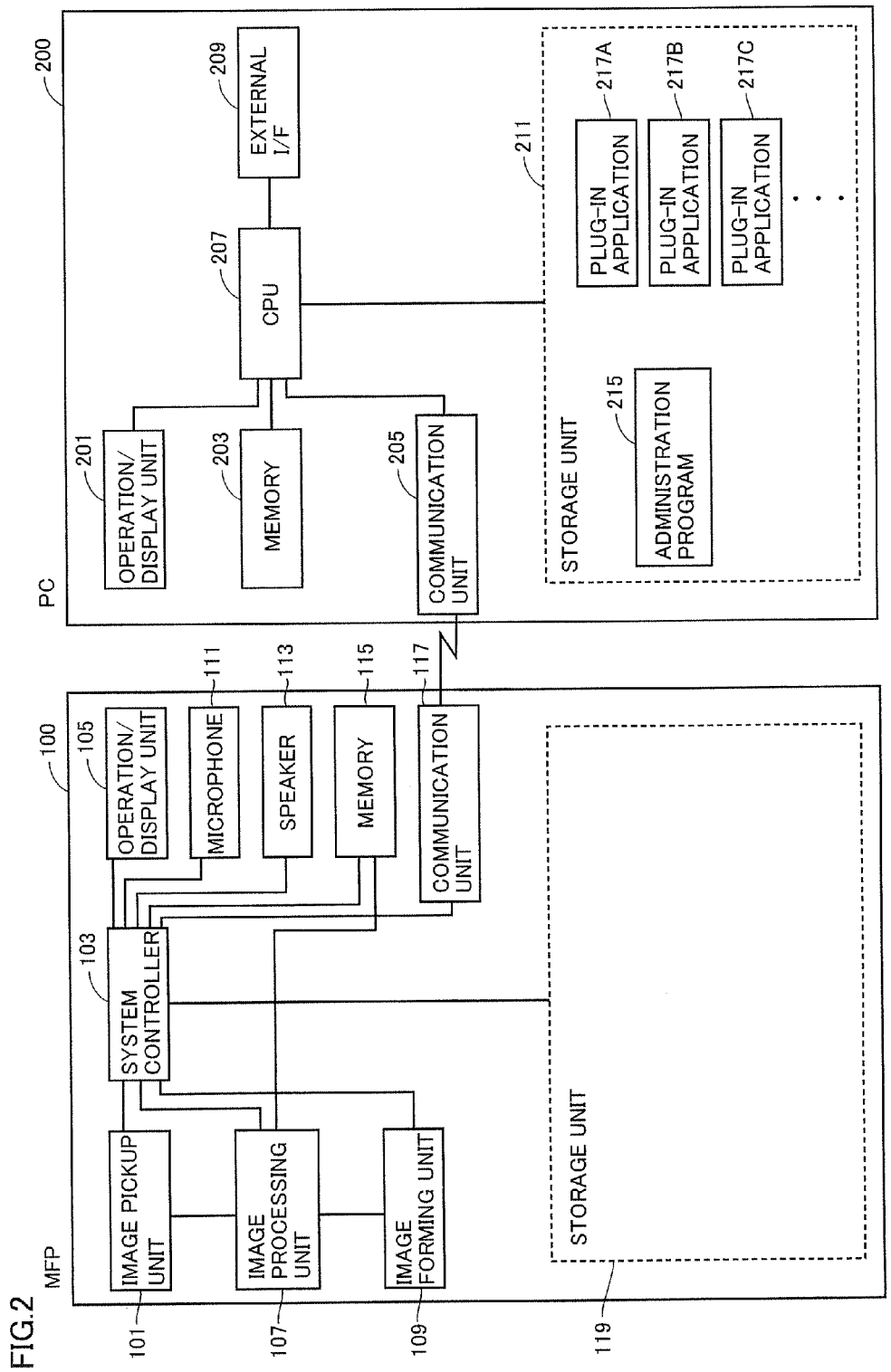
FIG. 2 is a block diagram showing the configurations of an MFP 100 and an administrator PC 200 in communication therewith.

FIG. 2 is a block diagram showing the configurations of one MFP 100 and administrator PC 200 in communication therewith.

Referring to FIG. 2, MFP 100 includes: a system controller 103 that performs overall control of the device; an image pickup unit 101 that has an optical system such as a CCD and reads an image from an original; an image processing unit 107 that performs various processing on an image; an image forming unit 109 that includes a print engine forming a toner image on a sheet of paper; an operation/display unit 105 that includes a touch panel provided with a liquid crystal display and displays information to the user and accepts an input of the user's operation; a microphone 111 that inputs sound; a speaker 113 that outputs sound; a memory 115 that stores image data and various programs; a communication unit 117 that performs communication via a network; and a storage unit 119 (hard disk or the like) that stores image data, user information, various programs and the like.

Administrator PC 200 includes: a CPU 207 that performs overall control of the device; an operation/display unit 201 having a monitor, keyboard, mouse and the like; a memory 203 that stores image data and various programs; a communication unit 205 that performs communication via a network; an external I/F 209 that performs communication with external image storage devices such as USB memory card, digital camera, external HDD and the like; and a storage unit 211 (hard disk or the like) that stores image data, user information, and various programs including an administration program 215 and plug-in applications 217A through 217E.

Figure 3:
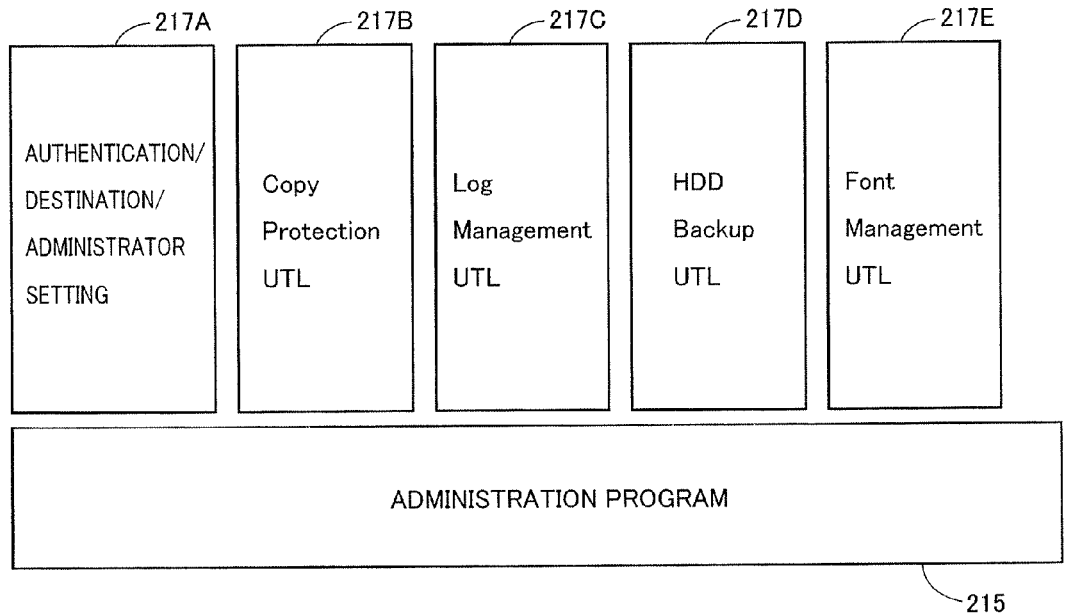
FIG. 3 shows relations between an administration program 215 and plug-in applications 217A through 217E.

FIG. 3 shows relations between administration program 215 and plug-in applications 217A through 217E.

Plug-in applications 217A through 217E run on administration program 215 serving as a common platform. Here, it is assumed that the following five plug-in applications run on administration program 215.

Authentication/destination/administrator Setting (217A)
Copy Protection Utility (217B)
log Management Utility (217C)
HDD Backup Utility (217D)
Font Management Utility (217E)

The administration program administrates the plug-in applications. The plug-in applications run independently from each other, and are installed to separate folders.

Figure 4:
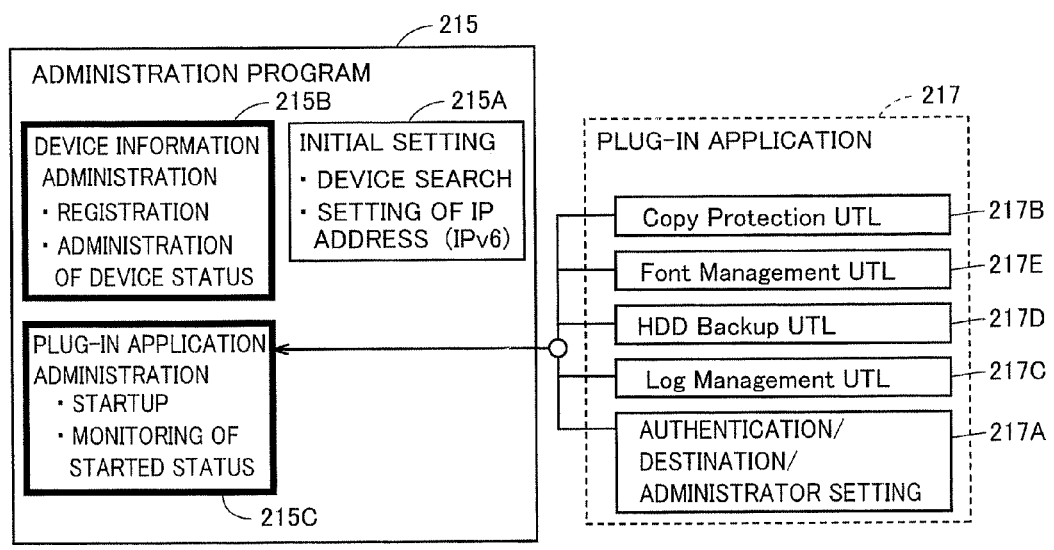
FIG. 4 shows the configuration of the administration program.

FIG. 4 shows the configuration of the administration program.

As shown in FIG. 4, administration program 215 links and communicates with the respective plug-in applications 217A through 217E.

Administration program 215 includes an initial setting block 215A, a device information administrative block 215B, and a plug-in application administrative block 215C.

Initial setting block 215A is responsible for device search to search a network for a device (here, an MFP), and setting of an IP address.

Device information administrative block 215B is responsible for registration of a device and administration of a status.

Plug-in application administrative block 215C is responsible for startup of a plug-in application and administration of a started status.

Figure 5:
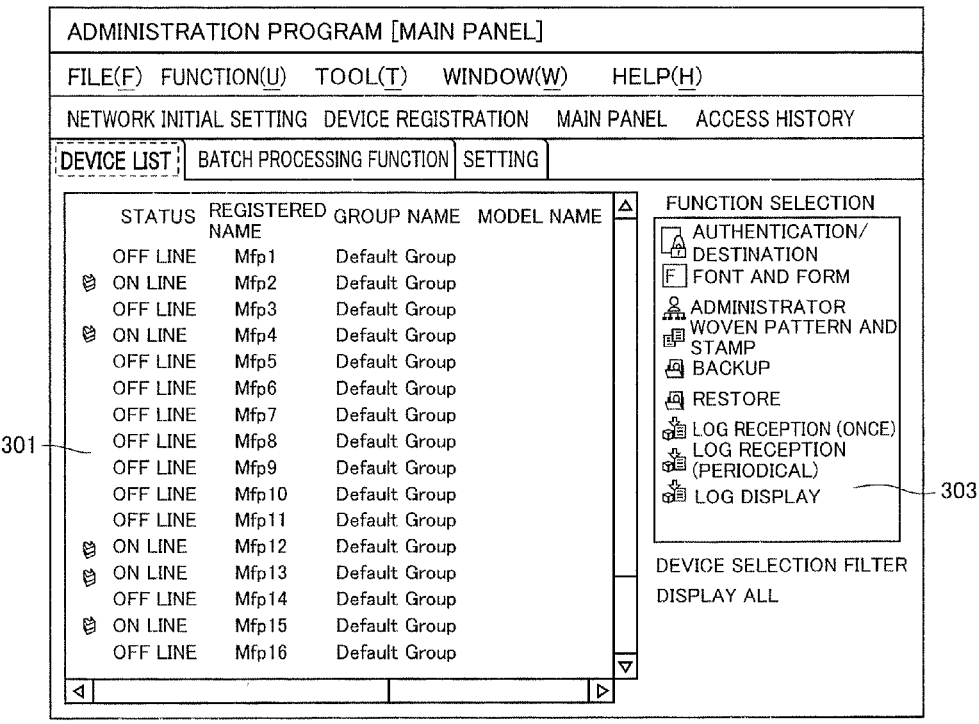
FIG. 5 shows a main panel (main window) of the administration program displayed on an operation/display unit 201 of administrator PC 200 when administration program 215 is started from a start menu or an icon on the desktop.

FIG. 5 shows a main panel (main window) of the administration program which is displayed on operation/display unit 201 of administrator PC 200 when administration program 215 is started from the start menu or an icon on the desktop of administrator PC 200.

This screen includes an MFP list display area 301 where the MFPs connected to the network are displayed, and a function selection area (function buttons) 303 where the administrator selects a function to be executed on a selected MFP. Here, the following buttons are displayed in function selection area 303: "authentication/destination", "font and form", "administrator", "woven pattern and stamp", "backup", "restore", "log reception (once)", "log reception (periodical)", and "log display". The "authentication/destination" and "administrator" buttons are for starting the plug-in application of authentication/destination/administrator setting 217A. The "font and form" button is for starting Font Management Utility 217E, and the "woven pattern and stamp" button is for starting Copy Protection Utility 217B. The "backup" and "restore" buttons are for starting HDD Backup Utility 217D, and the "log reception (once), "log reception (periodical)" and "log display" buttons are for starting Log Management Utility 217C.

The administrator selects an MFP to be operated from among the plurality of MFPs displayed in MFP list display area 301, via a mouse or the like. Following the selection of the MFP, the administrator selects a function to be executed from function selection area 303, via a mouse or the like. As a result, the plug-in application corresponding to the selected function is started, and the selected function is executed on the selected MFP.

Figure 6:
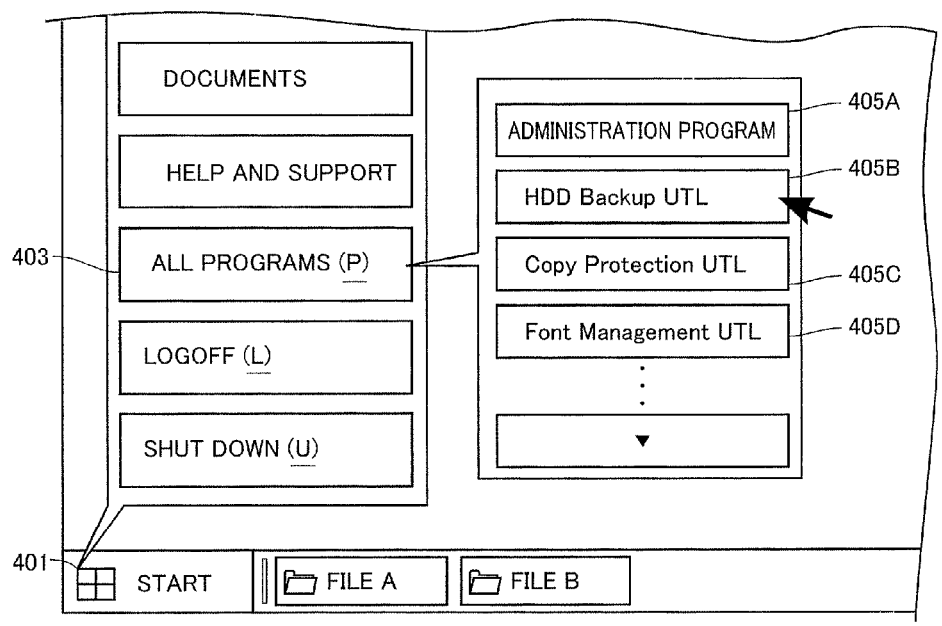
FIG. 6 shows a program startup screen from the start menu of administrator PC 200.

FIG. 6 shows a program startup screen from the start menu of administrator PC 200.

When a start button 401 included in the task bar is selected, a start menu 403 is displayed. When startup of a program ("All Programs") is selected from start menu 403, a list of the programs installed in administrator PC 200 is displayed. Here, the following are displayed in the list of programs: a choice 405A for starting administration program 215; a choice 405B for starting HDD Backup Utility; a choice 405C for starting Copy Protection Utility; and a choice 405D for starting Font Management Utility. Scrolling the screen enables other choices to be displayed.

The administrator may start administration program 215 or any plug-in application from the start menu or from an icon on the desktop. When administration program 215 is started, the screen shown in FIG. 5 is displayed. When the plug-in application is started, administration program 215 is started in the state where the relevant plug-in application is designated.

Figure 7:
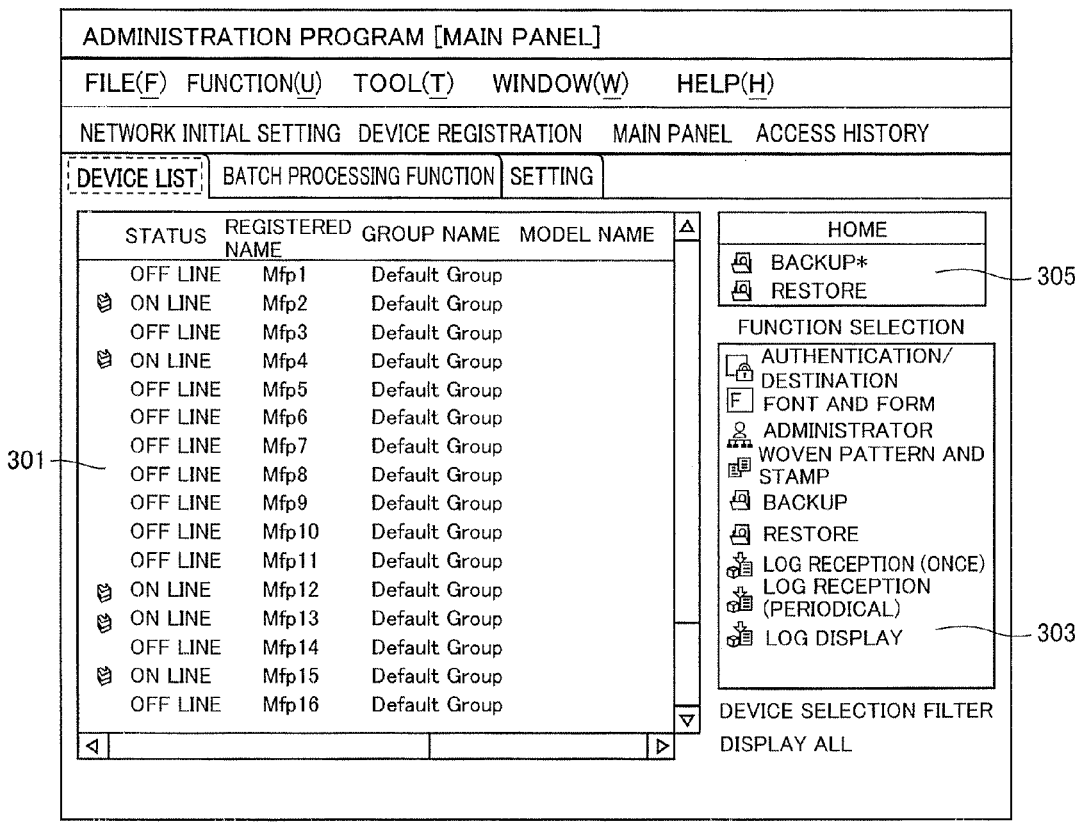
FIG. 7 shows a main panel (main window) of the administrator program when HDD Backup Utility, which is a plug-in application, is started from the start menu or an icon on the desk top.

FIG. 7 shows a main panel (main window) of administration program 215 at the time when the plug-in application "HDD Backup Utility" is started from the start menu or an icon on the desktop.

This screen includes a HOME display area 305 in addition to the configuration of the main panel (main window) of the administration program at the time of startup of administration program 215 shown in FIG. 5. Buttons displayed in HOME display area 305 (here, "backup" and "restore" buttons corresponding to HDD Backup Utility) are for selecting the function of the plug-in application started at the start menu or the like. The HOME display area is located at the top of the array of the function buttons displayed in function selection area 303. The buttons in HOME display area 305 are more conspicuous than the other buttons, which allows the administrator to easily find the buttons in the HOME display area for selection. In this manner, the function buttons for the designated plug-in application are displayed in the position where the administrator can readily perform the selecting operation.

In order to establish such a display, when a plug-in application is started from the start menu, administration program 215 receives information indicating which plug-in application was started, and based on the received information, places the appropriate buttons for the plug-in application in the HOME display area.

The "*" mark displayed on the right side of the "backup" button indicates a default function. When the mouse is double-clicked on the display of a certain device or the enter key is depressed after selection of a certain device in MFP list display area 301 on the left side, the default function is started (in the example shown in FIG. 7, "backup" is carried out).

Figure 8:
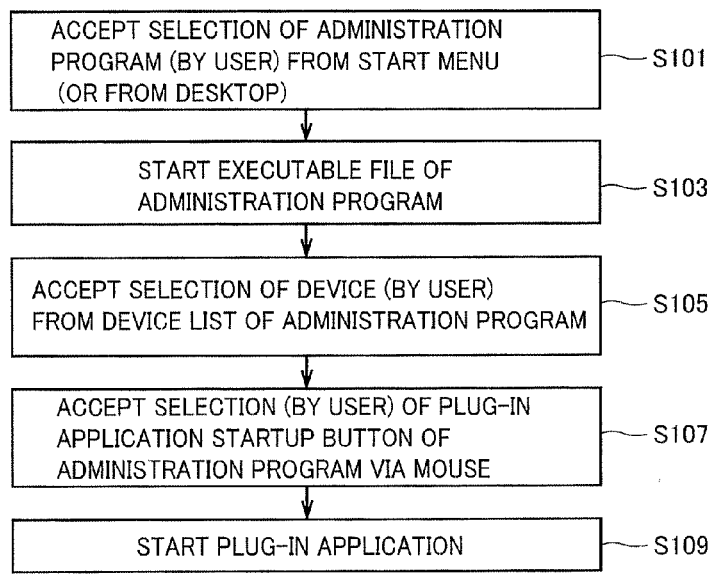
FIG. 8 is a flowchart illustrating the operation of administrator PC 200 when administration program 215 is selected as startup software.

FIG. 8 is a flowchart illustrating the operation of administrator PC 200 when administration program 215 is selected as startup software.

Referring to FIG. 8, in step S101, administrator PC 200 accepts selection of administration program 215 (via an operation of the administrator who is the user) from the start menu (or from the desktop) of administrator PC 200. In step S103, administrator PC 200 starts an executable file of the administration program. In response, the screen shown in FIG. 5 is displayed.

When a device to be operated is selected (via an operation of the administrator who is the user) from MFP list display area 301 of the administration program, in step S105, the administration program running on administrator PC 200 accepts the selection. Thereafter, when a button of the function to be executed is selected (via an operation of the administrator who is the user) from the function selection area (function buttons) 303, in step S107, the administration program running on administrator PC 200 accepts the selection. Correspondingly, the plug-in application corresponding to the selected button is started in step S109. The plug-in application performs processing on the selected device.

Figure 9:
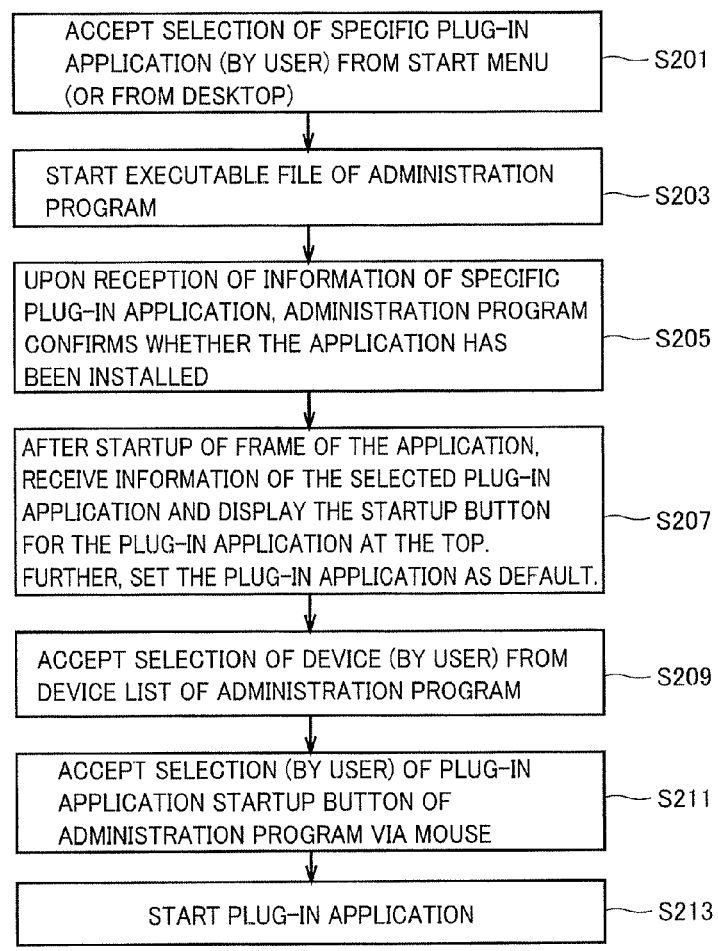
FIG. 9 is a flowchart illustrating the operation of administrator PC 200 when a plug-in application is selected as the startup software.

FIG. 9 is a flowchart illustrating the operation of administrator PC 200 when a plug-in application is selected as the startup software.

Referring to FIG. 9, in step S201, administrator PC 200 accepts selection of a specific plug-in application (via an operation of the administrator who is the user) from the start menu (or from the desktop).

In step S203, administrator PC 200 starts an executable file of the administration program.

Specifically, the operating system (OS) starts the executable file ("exe" file) of the application of the administration program. At this time, the information of the selected plug-in application is passed to the administration program.

For example, at the time of startup of the administration program, the command "C:¥Program Files¥PSDA¥DeviceManager.exe -p 1002" is transmitted to the OS. Here, description of "-p" indicates that the ID of the plug-in application is passed as a parameter. Description of "1002" indicates the ID assigned to the selected plug-in application.

In step S205, the administration program running on administrator PC 200 receives the information of the selected plug-in application. The administration program confirms whether the relevant plug-in application has been installed.

It is noted that the following specifications are conceivable for the process in step S205.

<Specification 1> Each plug-in application is assigned an ID. The ID information of the installed plug-in applications is saved in a specific folder. The administration program searches the folder for the ID of the selected plug-in application.

For example, a definition file of each plug-in application is saved in the specific folder. This is for administration of the installed plug-in applications, with the ID of each plug-in application as the file name and ".plg" as its extension. At the time of startup of the administration program, when the command "C:¥Program Files¥PSDA¥DeviceManager.exe -p 1002" is transmitted to the OS, the administration program searches for the file "1002.plg", as described above. That the file exists indicates that the corresponding plug-in application has been installed.

The definition file of the plug-in application preferably contains the following information:
  Path of the executable file of the plug-in application;
  Character string for the name of the start button of the plug-in application; and
  Copyright information of the plug-in application.

<Specification 2> An executable file (exe-type file) of the plug-in application is designated, and the administration program searches for the relevant executable file.

Returning to FIG. 9, if the selected plug-in application exists, the administration program continues the processing, determining in step S205 that the application has been installed. If the selected plug-in application does not exist, the plug-in application has not been installed, and thus, the administration program alone is started, with the information of the plug-in application being ignored. In this case, the process in step S207 is skipped.

After startup of the administration program, in step S207, the administration program receives the information of the selected plug-in application. The administration program displays the start button for the plug-in application at the top level (in the HOME position). Further, it sets the relevant plug-in application to a default plug-in application.

While the function button for the selected plug-in application is displayed in the HOME display area to make it conspicuous in this example, any of the following manners can also be chosen to draw attention to the function button for the selected plug-in application:

(1) Display the relevant function button in a greater size than the other buttons;

(2) Display the relevant function button in an upper part on the screen than the other buttons;

(3) Display the relevant function button in bold;

(4) Display the relevant function button inverted;

(5) Cause the relevant function button to blink;

(6) Display the relevant function button additionally in a location other than the listings of all function buttons; or (7) Change the order of the function buttons so that the relevant function button is displayed at the top of the array.

Instead of or in addition to making the button conspicuous, the selected plug-in application may be assigned a higher priority. For example, the order of placing the focus on the relevant application by means of a "Tab" key on the keyboard may be pushed forward. More specifically, when the "Tab" key is depressed in the state where MFP list display area 301 has the keyboard focus (i.e., in the state where MFP list display area 301 is selected), focus moves to a function button. In this example, it is configured such that the focus is placed first on the function button for the selected plug-in application. Thereafter, the focus moves to another function button every time the "Tab" key is depressed.

When a device to be operated is selected (via an operation of the administrator who is the user) from MFP list display area 301 of the administration program, in step S209, the administration program running on administrator PC 200 accepts the selection. For example, the administrator may select the device as a target of administration from the device list by left-clicking the mouse on the relevant device.

When the button for the function to be executed is selected (by the administrator who is the user) in the function selection area (function buttons) 303, in step S211, the administration program accepts the selection. The administration program starts the plug-in application associated with the selected function button. At this time, the information of the selected device is also passed to the plug-in application as a parameter. This causes the selected plug-in application to be started in step S213. The plug-in application performs processing on the selected device.

The operation at the time of startup of the plug-in application differs for each plug-in application. For example, an application for device administration accesses the device based on the received device information. Thereafter, it obtains the necessary information from the device to allow for immediate administration of the device.

Figure 10:
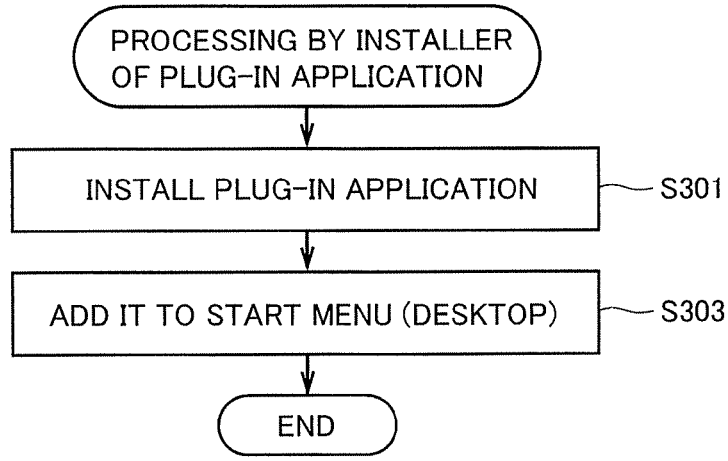
FIG. 10 is a flowchart illustrating the operation of an installer of a plug-in application in administrator PC 200.

FIG. 10 is a flowchart illustrating the operation of an installer of the plug-in application in administrator PC 200.

In step S301, the installer confirms that the administration program has been installed, and installs a plug-in application. In step S303, it adds the installed plug-in application to the start menu (and also adds its icon onto the desktop).

Figure 11:
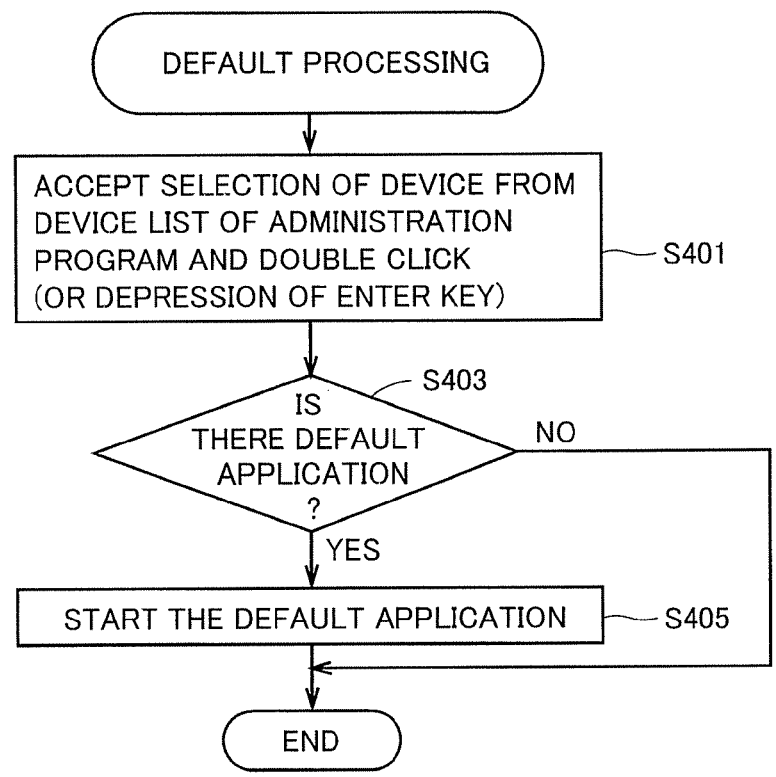
FIG. 11 is a flowchart illustrating processing of starting a default plug-in application.

FIG. 11 is a flowchart illustrating the processing of starting a default plug-in application.

Referring to FIG. 11, when a device is selected from MFP list display area 301 in FIG. 7 and the mouse is double-clicked (or the enter key is depressed) (by the administrator who is the user), in step S401, the administration program running on administrator PC 200 accepts the selection. In step S403, the administration program determines whether the default plug-in application has been set. This is set in step S207 in FIG. 9.

If there exists the default plug-in application, in step S405, the administration program starts the relevant plug-in application. This allows the function of the default plug-in application to be performed on the selected device.

The basic operations of the administration program include: (1) selection of a device from MFP list display area 301; and (2) selective operation of a function button. The operation of (2) above may be omitted by selecting the device by double-clicking or the like. In such a case, the function of the plug-in application started from the start menu is set as the function to be selected as default.

Further, if a function B is started in the state where the plug-in application A (function A) has already been started from the start menu and set as default, the function B may newly be set as default.

Still further, the function that is displayed in the HOME display area may be set to the default, or the function not displayed in the HOME display area may be set to the default.

Figure 12:
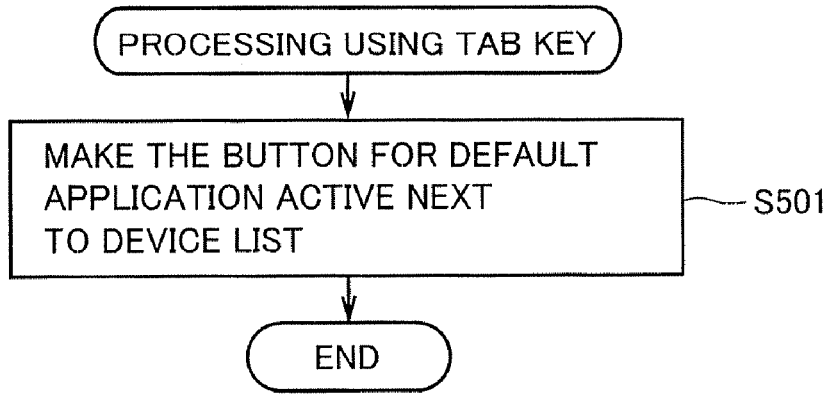
FIG. 12 is a flowchart illustrating Tab key processing.

FIG. 12 is a flowchart illustrating the processing using the Tab key.

Referring to FIG. 12, in step S501, the administration program sets the order of selection by the Tab key such that the button for starting the default plug-in application becomes active next to the device list.

With this process, the order in which controllers (buttons, lists or the like) are made active by the Tab key is changed.

Specifically, it is set such that the default function button becomes active next to the device list.

The OS application such as Windows (registered trademark) is operable only via a keyboard, without the use of a mouse. It is possible to activate the controllers in order by depressing the Tab key on the keyboard in the state where focus is placed on any controller on the screen. The controllers are made active usually from left to right, and from top to bottom.

In the case where the plug-in application A (function A) has already been started from the start menu or the like, the above-described order is changed such that the button for the function A is active next to the device list. For example, assume that the order of activating the controllers is initially as follows: (1) device list, (2) function X, (3) function Y, (4) function A, and (5) function Z. When the plug-in application A (function A) is started from the start menu or the like, the order is changed as follows: (1) device list, (2) function A, (3) function X, (4) function Y, and (5) function Z.

Second Embodiment

Figure 13:
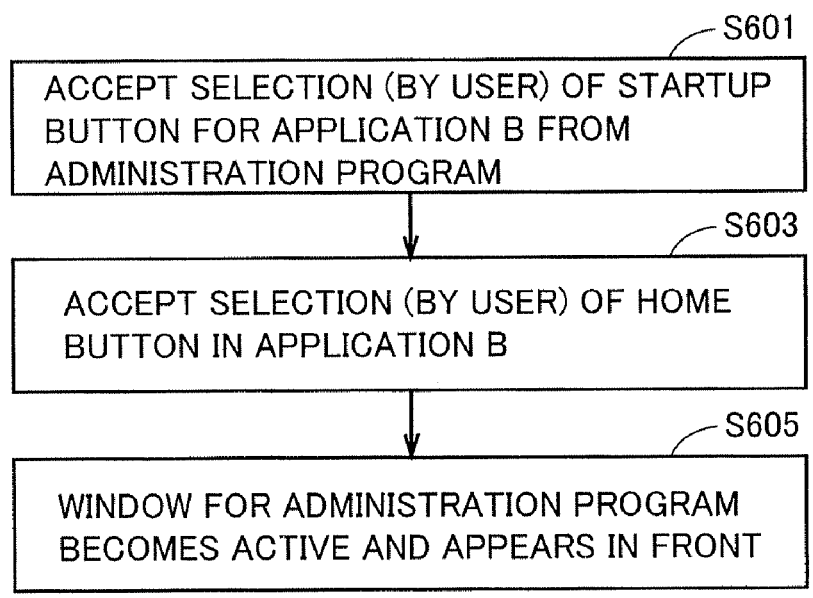
FIG. 13 is a flowchart illustrating the operation of an administrator PC according to a second embodiment of the present invention.

FIG. 13 is a flowchart illustrating the operation of an administrator PC according to a second embodiment of the present invention.

Every time a plug-in application is started on an administration screen, the administration program of the present embodiment opens the window for the relevant application. The administration program is a Multiple Document Interface (MDI) type Windows (registered trademark) application (which displays a plurality of child windows in the main window). Here, a specific plug-in application started from the start menu is called the "application A", and another plug-in application is called the "application B". It is assumed that the administration program has already been started.

It is assumed that a function button (start button) for application B is selected (by the user) in the administration program. In step S601, the administration program accepts the selection, and starts the executable file associated with the relevant function button. The screen for application B is provided with a HOME button. When the HOME button is selected, the screen having the start button for application A therein is displayed. That is, in the present embodiment, the device list window for the administration program is displayed.

It is noted that the HOME button may be displayed in a tool bar shared by the plug-in applications.

It is assumed that the HOME button is selected (by the user). In step S603, the administration program accepts the operation. When the selection of the HOME button is detected by the administration program, a message is transmitted to the OS to activate the window of the administration program. As a result, in step S605, the administration program becomes active, and its screen is displayed in front. In this state, the screen including the button for starting plug-in application A appears in front, which allows the user to immediately start the plug-in application A.

Figure 14:
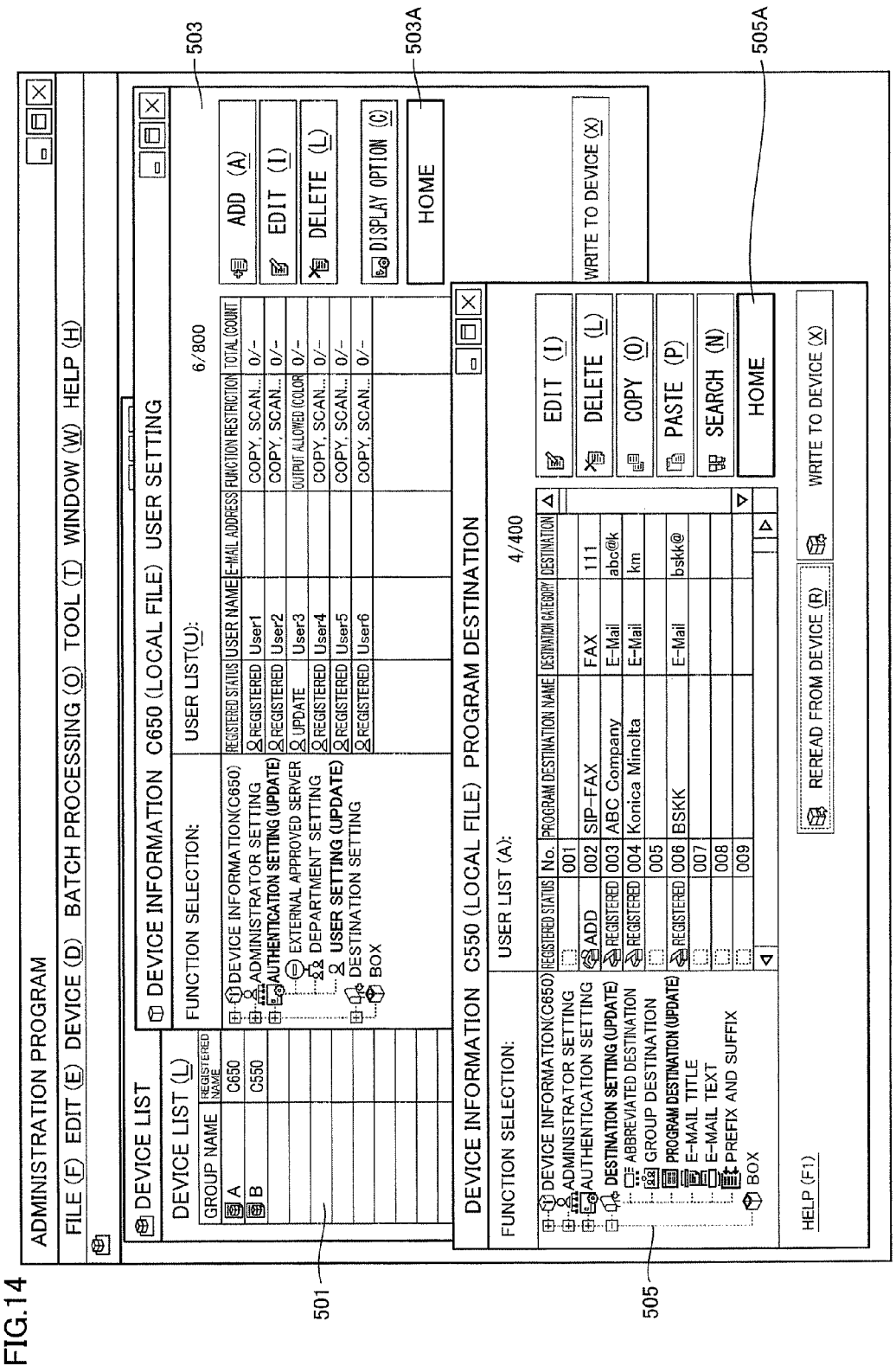
FIG. 14 shows an example of display on a screen of the administration program of the second embodiment.

FIG. 14 shows a display example of the screen for the administration program according to the second embodiment.

Here, it is assumed that the specific plug-in application (application A) started from the start menu is "HDD Backup Utility". Assume that the plug-in application "authentication/destination/administrator setting" is selected as the application B after a device is selected in a device selection window 501 of the administration program. At this time, the window for the relevant plug-in application opens. Shown here is the state where the plug-in application window 503 for the device C650 and the plug-in application window 505 for the device C550 are displayed. The device selection window 501 of the administration program is located beneath the windows 503 and 505.

Windows 503 and 505 include HOME buttons 503A and 506A, respectively. When either of the HOME buttons is selected, device selection window 501 of the administration program becomes active. This device selection window 501 includes the button for starting the application A described above.

In the case where a plurality of windows are open, the window having the device list displayed therein is not always active (i.e., such a window is not always displayed in front and operable). When the HOME button is displayed in every window as in the present embodiment, the window for starting the plug-in application increased in priority may be displayed regardless of the windows being displayed.

Third Embodiment

In the second embodiment described above, the HOME button is displayed in the window of each plug-in application. Instead, in the third embodiment, a button for starting a specific plug-in application selected from the start menu or the like is displayed.

Figure 15:
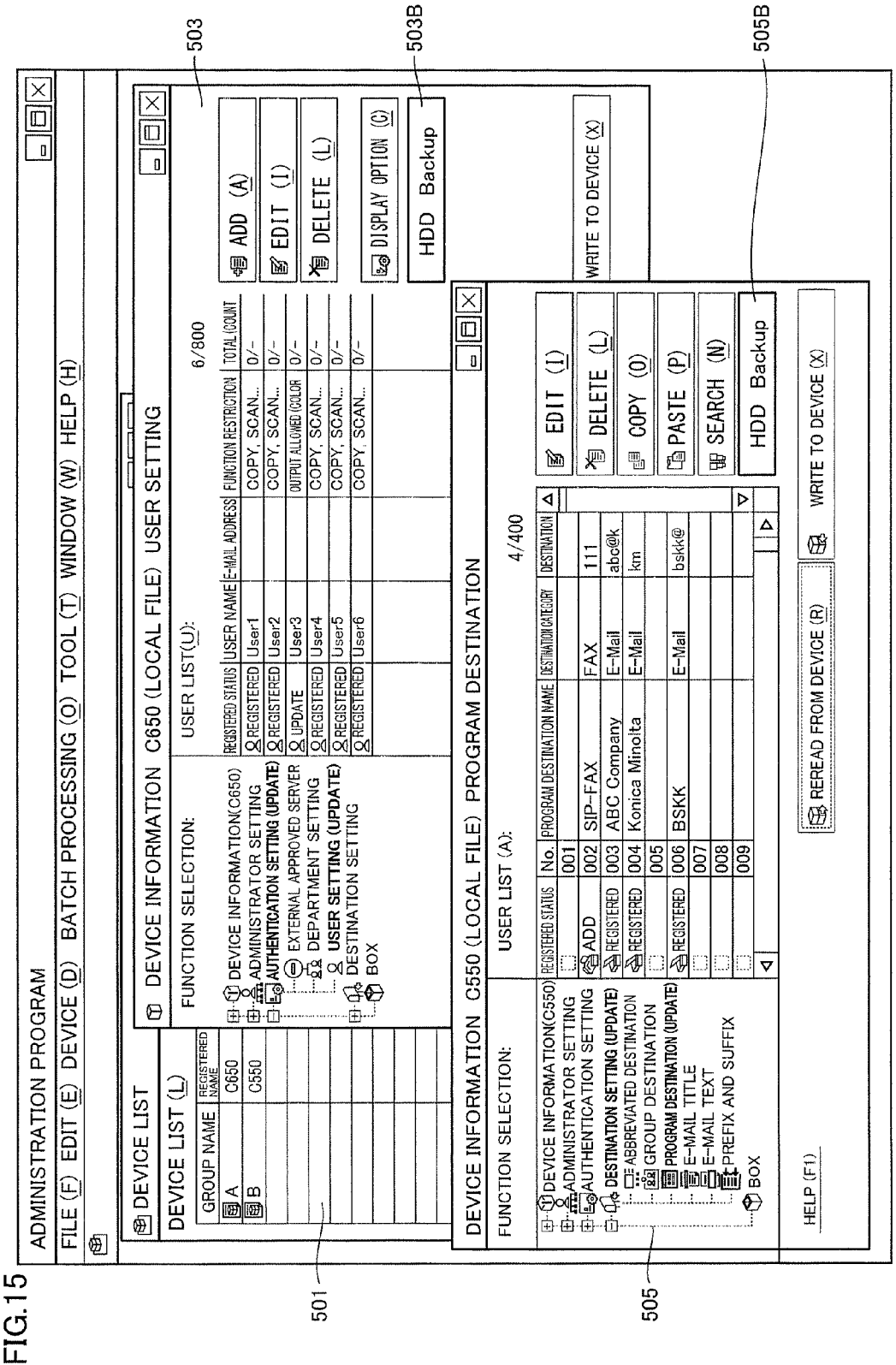
FIG. 15 shows an example of display on a screen of the administration program according to a third embodiment of the present invention.

FIG. 15 shows a display example of the screen of the administration program according to the third embodiment.

It is assumed that the specific plug-in application (application A) started from the start menu is "HDD Backup Utility" as in the case of FIG. 14 above. It is also assumed that the plug-in application "authentication/destination/administrator setting" is selected as the application B after the device is selected in device selection window 501 of the administration program. At this time, the window for the relevant plug-in application opens. Shown here is the state where the plug-in application window 503 for device C650 and the plug-in application window 505 for device C550 are displayed. Device selection window 501 of the administration program is located beneath windows 503 and 505.

Windows 503 and 505 respectively include start buttons 503B and 505B of "HDD Backup Utility". When either of the buttons is selected, the plug-in application "HDD Backup Utility" is started without opening of the device list window. The device to be operated at the time of startup is the one corresponding to the window in which the start button for "HDD Backup Utility" was selected.

It is noted that, when the plug-in application "HDD Backup Utility" has already been started, the started window may be made active.

Figure 16:
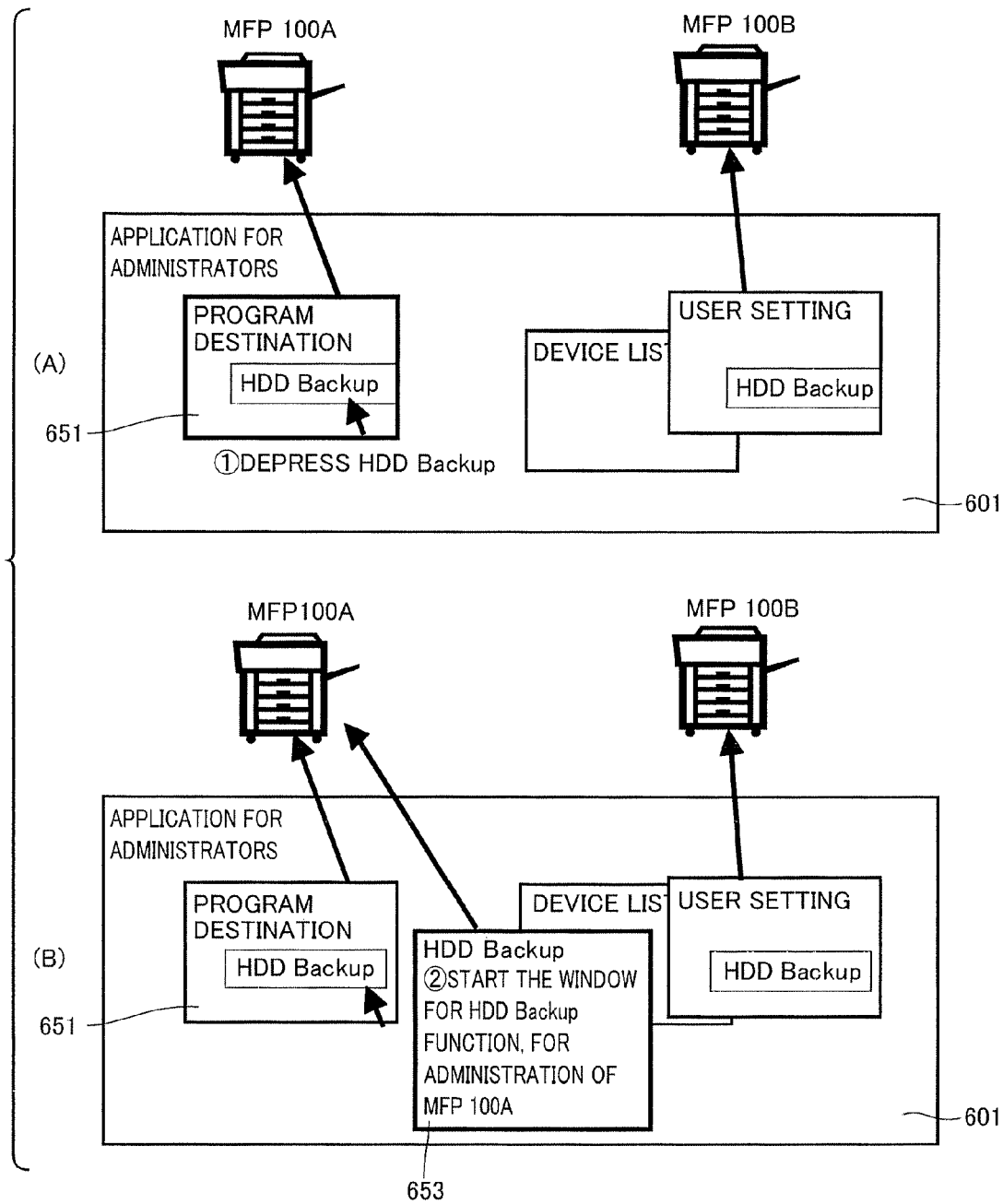
FIGS. 16 and 17 each show the operation of the administration program of the third embodiment.

FIG. 16 shows a first operation of the administration program according to the third embodiment.

It is assumed, as shown in FIG. 16(A), that a plug-in application window 651 for performing setting of MFP 100A is open in a window 601 of the administration program (i.e., the application for administrators). In this state, when the "HDD Backup Utility" button in window 651 is selected, an HDD Backup Utility window 653 is newly activated, as shown in FIG. 16(B), in which the HDD of MFP 100A can be administrated.

Figure 17:
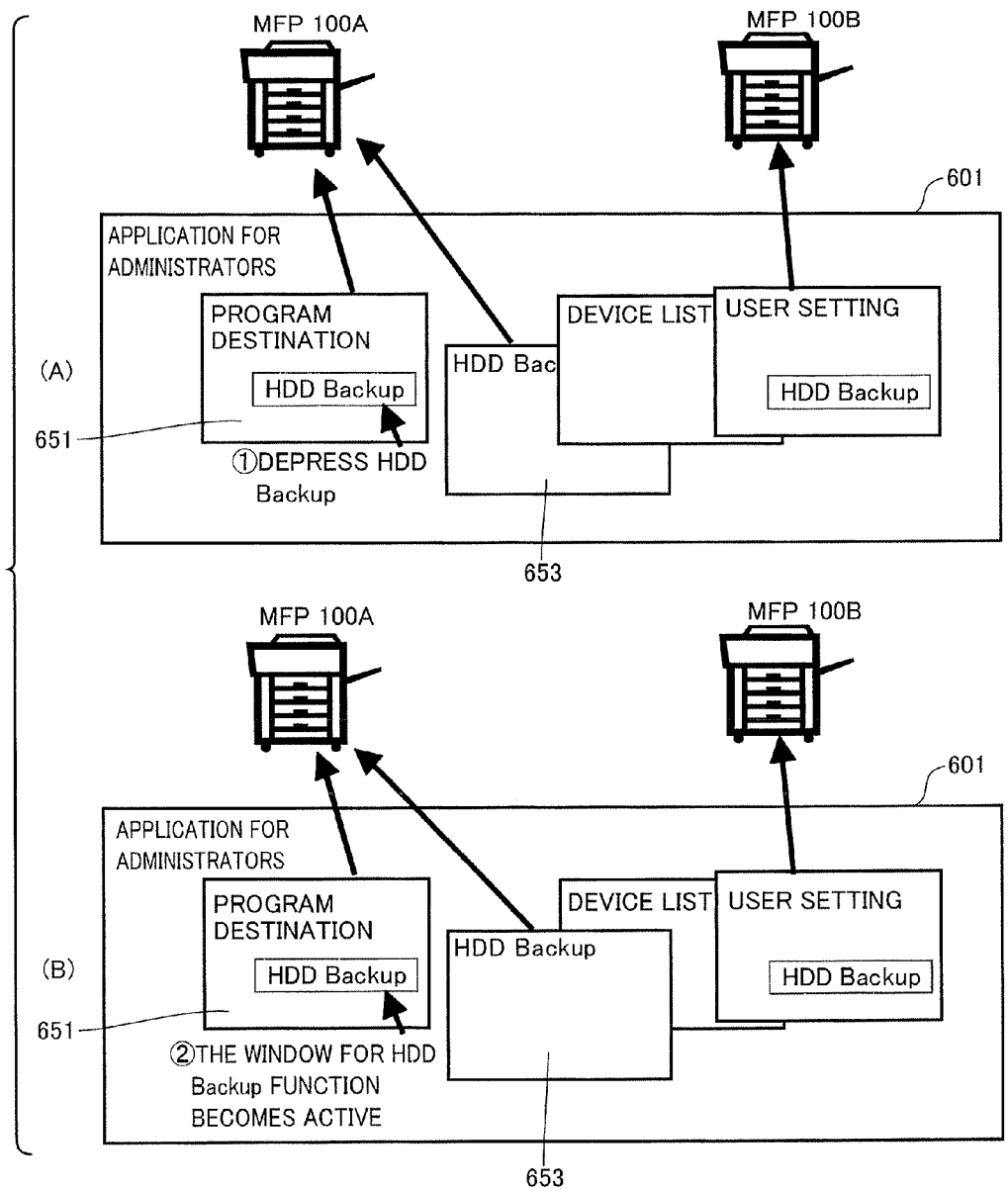

FIG. 17 shows a second operation of the administration program according to the third embodiment.

It is assumed, as shown in FIG. 17(A), that the plug-in application window 651 for performing setting of MFP 100A is open in the window 601 of the administration program (i.e., the application for administrators). It is further assumed that the plug-in application "HDD Backup Utility" has already been started and that the HDD Backup Utility window 653 is open. In this state, when the "HDD Backup Utility" button in window 651 is selected, the HDD Backup Utility window 653 becomes active, as shown in FIG. 17(B), in which the HDD of MFP 100A can be administrated.

Figure 18:
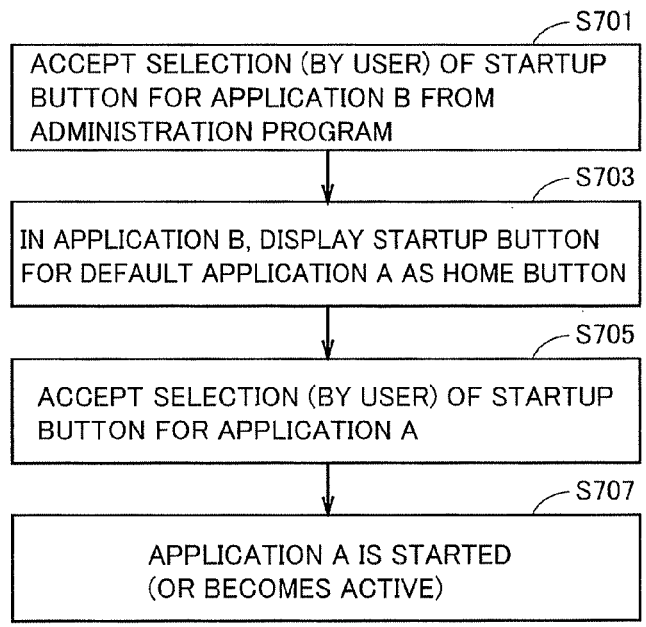
FIG. 18 is a flowchart illustrating the operation of an administrator PC according to the third embodiment.

FIG. 18 is a flowchart illustrating the operation of an administrator PC according to the third embodiment.

It is assumed that the start button for application B has been selected (by the user). The administration program accepts the selection in step S701. In step S703, the start button for the default application A is displayed in the window for application B. When the start button for the application A is selected (by the user), the administration program accepts the selection in S705, and the application A is started (or, the window for application A becomes active) in step S707.

At the time of opening the window for each plug-in application, the window for the specific plug-in application started from the start menu may be made greater in area than any other windows, to make it conspicuous.

Other Embodiments

The above-described processing is applicable to home appliances, mobile phones, personal digital assistants and the like which adopt the module configuration where a plurality of plug-in applications run on a common UI (or, a platform constituting the user interface).

For example, the home appliance such as a television set and the mobile phone have a display and input device provided only with a simple input device such as up, down, left and right arrow keys. When selecting a function in such a device, it is not possible to perform a complicated operation such as adding an option to a command line. Thus, the display manner on the platform is changed according to the determination as to which plug-in application was started.

By way of example, the case of applying the above-described processing to a television set will now be explained. A user selects a function using the up, down, left and right arrow keys on the remote controller. The functions may include "program listing", "timer recording", and "program search", which are implemented by different plug-in applications.

Figure 19:
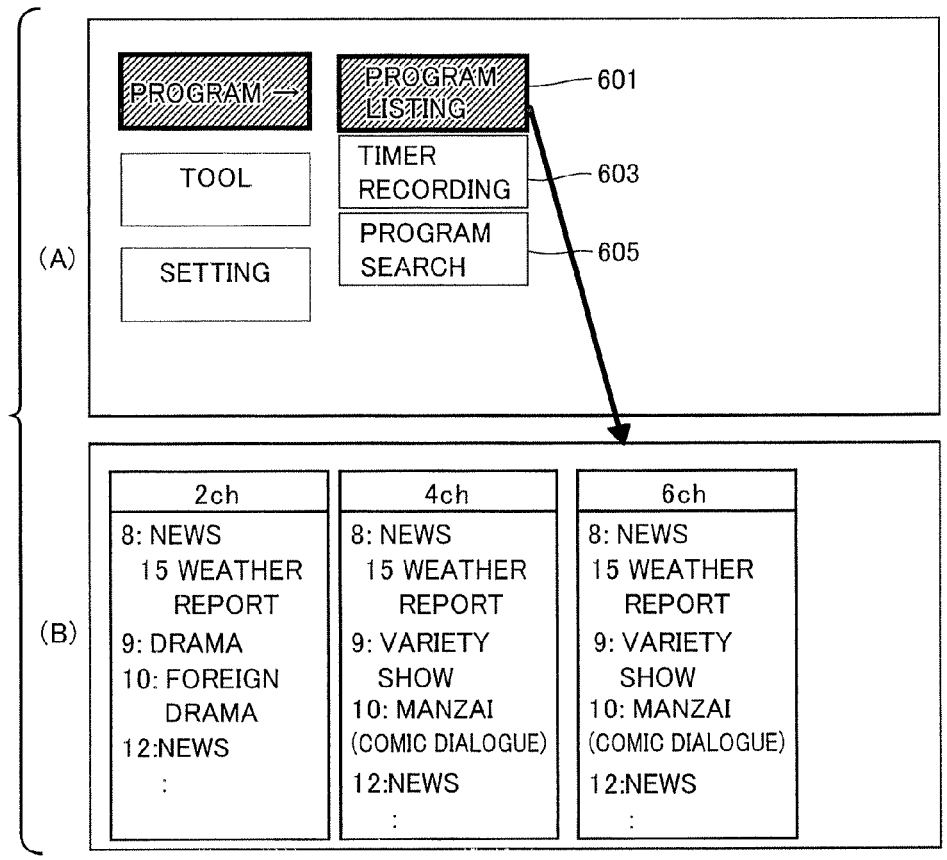
FIG. 19 shows the screen displayed when a "program listing" function is selected.

FIG. 19 shows the screen displayed when the "program listing" function is selected.

As shown in FIG. 19(A), when the user selects a program listing 601, only the program listing is displayed in a large size at the center of the screen, as shown in FIG. 19(B).

Figure 20:
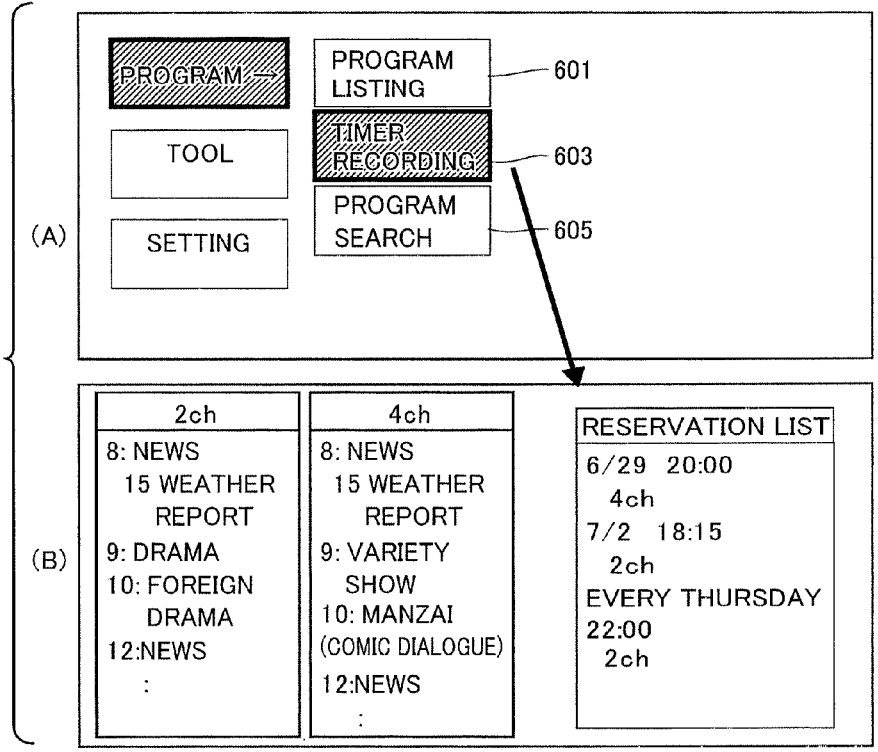
FIG. 20 shows the screen displayed when a "timer recording" function is selected.

FIG. 20 shows the screen displayed when the "timer recording" function is selected.

When the user selects a timer recording 603 as shown in FIG. 20(A), the program listing is displayed on the left and the result of the reservation is displayed on the right on the screen, as shown in FIG. 20(B). The user performs the reservation while selecting a program from the program listing. The result of the reservation is added to the reservation list on the right.

Figure 21:
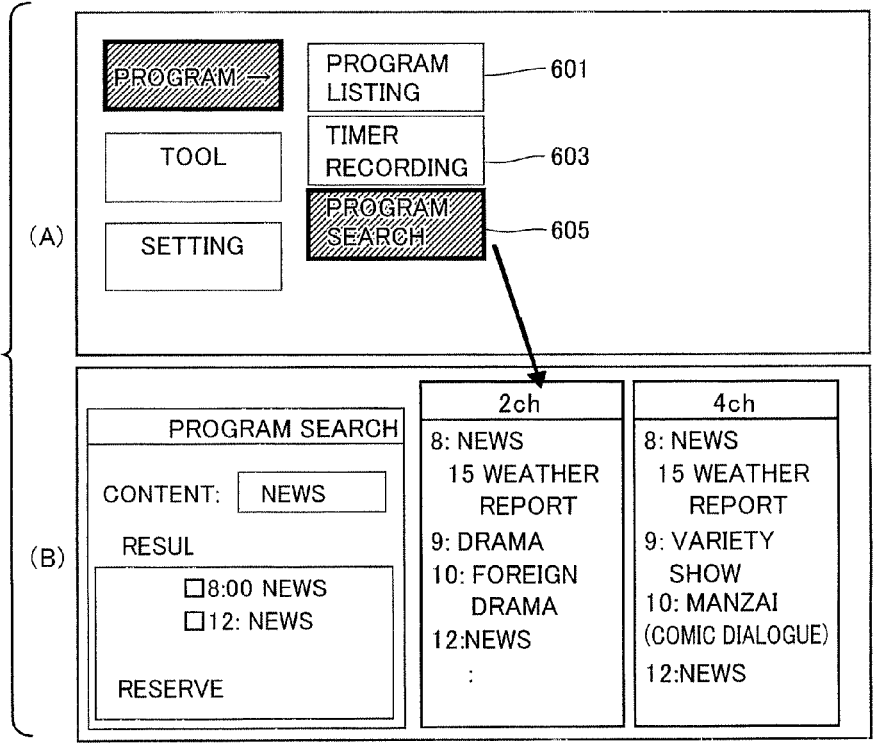
FIG. 21 shows the screen displayed when a "program search" function is selected.

FIG. 21 shows the screen displayed when the "program search" function is selected.

When the user selects a program search 605 as shown in FIG. 21(A), the search condition and result are displayed on the left and the program listing for reference is displayed on the right of the screen, as shown in FIG. 21(B).

The plug-in applications of "program listing", "timer recording" and "program search" run on a common platform. When the user selects a plug-in application to be started, the desired function is displayed in a most readily accessible manner.

While the three types of plug-in applications have been explained here, the user may download an additional plug-in application for use on the platform.

Hereinafter, the case of applying the above processing to the mobile phone will be described.

Some applications for the mobile phone are pre-installed, while the others are downloaded. The above processing is applicable to such applications for the mobile phone as long as they run on a common platform. That is, the display manner of the UI after startup is changed according to the application to be started.

For example, a software game is considered as an application. Assume that the game is large in size, and thus, the stages of the game having a common platform are downloaded separately. If the structure of the body of the game is the same while the content changes for the stage to be started, the display manner can be changed according to the stage.

<Effects in the Embodiments>

According to the embodiments described above, it is possible to change the UI when a plug-in application is started from the start menu or the like, depending on the started application.

For example, when a certain plug-in application is selected and started from the start menu, the button for that plug-in application is added to the noticeable position. This allows the user to easily find and select the operation button for the started plug-in application. In other words, the function of the plug-in application started from the start memo is displayed preferentially, so that the user can readily use the function.

Further, even during the operation of another plug-in application, the HOME button may be selected to display the screen enabling immediate startup of the plug-in application of higher priority.

Furthermore, by registering the plug-in application in the start menu, it is possible to inform the user as to which plug-in application has been installed and available, without the need to start the administration program.

Still further, when the function of the plug-in application started from the start menu is set as the default function, the operation by the user becomes simple.

Furthermore, changing the order of movement of focuses by the Tab key improves operability from the keyboard. In the above-described embodiment, when the Tab key is depressed once after the device is selected, the preferential function is selected. Since the number of times of depression of the Tab key for executing the preferential function is fixed, design of the macro for operating the UI or the like becomes simple.

<Others>

The present invention can be implemented on an administration program, administration device, and administration method for an image processing device such as an MFP, facsimile machine, copier, server, computer device or the like. The present invention can also be implemented on an administration program, administration device, and administration method for an image forming device such as an MFP, facsimile machine, copier or the like.

Further, it is possible to provide a program for executing the processing as described in the above embodiments. The program may be provided to the user in the form recorded on a recording medium such as a CD-ROM, flexible disk, hard disk, ROM, RAM, memory card or the like. Alternatively, the program may be downloaded to the device via a communication line such as the Internet.

It should be understood that the embodiments described above are illustrative and non-restrictive in every respect. The scope of the present invention is defined by the terms of the claims, rather than the description above, and is intended to include any modifications within the scope and meaning equivalent to the terms of the claims.

What is claimed is:

1. An administration device for a plurality of image processing devices, the administration device comprising:
    an acquiring unit to acquire information for specifying a plug-in application designated by a user from among a plurality of installed plug-in applications;
    an administration program starting unit to start an administration program when a plug-in application of said administration program is designated by the user;
    a display unit to display a user interface for selecting the designated plug-in application such that said plug-in application designated by the user can be selected by the user;
    an accepting unit to accept, from the user, selection of one of said plurality of image processing devices as a target of operation;
    an application starting unit to start the selected plug-in application when the plug-in application is selected by said user; and
    a providing unit to provide, at the time of startup of said plug-in application, information of said selected device to the plug-in application being started,
    wherein when the user designates the plug-in application, the display unit displays buttons related to the designated plug-in application in a home display area, and
    wherein the buttons displayed in the home display area represent less than all of the plug-in applications.

2. The administration device for an image processing device according to claim 1, wherein said administration program starting unit starts said administration program when a plug-in application to be operated with said administration program is designated from a start menu.

3. The administration device for an image processing device according to claim 1, wherein said display unit causes a function button associated with said plug-in application designated by the user to be displayed in a location readily accessible by the user.

4. The administration device for an image processing device according to claim 1, wherein said display unit sets said plug-in application designated by the user to a default plug-in application.

5. The administration device for an image processing device according to claim 1, wherein said display unit changes the order in which said plug-in application designated by the user is selected by a Tab key.

6. The administration device for an image processing device according to claim 1, wherein said display unit changes a display manner such that a function button associated with said plug-in application designated by the user is conspicuous.

7. The administration device for an image processing device according to claim 1, wherein when another plug-in application other than said plug-in application designated by the user is started, a button for starting said plug-in application designated by the user is displayed on a screen for the other plug-in application.

8. The administration device for an image processing device according to claim 1, wherein when another plug-in application other than said plug-in application designated by the user is started, a button for displaying a screen in which said plug-in application designated by the user can be started is displayed on a screen for the other plug-in application.

9. A method for administrating a plurality of image processing devices, comprising:
    an administration program starting step of starting an administration program when a plug-in application of said administration program is designated by a user;
    an acquiring step of acquiring information for specifying said plug-in application designated by the user;
    a display step of displaying a user interface for selecting the designated plug-in application such that said plug-in application designated by the user can be selected by the user;
    an accepting step to accept, from the user, selection of one of said plurality of image processing devices as a target of operation;
    an application starting step to start the selected plug-in application when the plug-in application is selected by said user; and
    a providing step to provide, at the time of startup of said plug-in application, information of said selected device to the plug-in application being started,
    wherein when the user designates the plug-in application, the display step displays buttons related to the designated plug-in application in a home display area, and
    wherein the buttons displayed in the home display area represent less than all of the plug-in applications.

10. The method for administrating an image processing device according to claim 9, wherein said administration program starting step includes the step of starting said administration program when a plug-in application to be operated together with said administration program is designated from a start menu.

11. The method for administrating an image processing device according to claim 9, wherein said display step includes the step of displaying a function button associated with said plug-in application designated by the user in a location readily accessible by the user.

12. The method for administrating an image processing device according to claim 9, wherein said display step includes the step of setting said plug-in application designated by said user to a default plug-in application.

13. The method for administrating an image processing device according to claim 9, wherein said display step includes the step of changing the order in which said plug-in application designated by the user is selected by a Tab key.

14. The method for administrating an image processing device according to claim 9, wherein said display step includes the step of changing a display manner such that a function button associated with said plug-in application designated by the user is conspicuous.

15. The method for administrating an image processing device according to claim 9, wherein when another plug-in application other than said plug-in application designated by the user is started, a button for starting said plug-in application designated by the user is displayed on a screen for the other plug-in application.

16. The method for administrating an image processing device according to claim 9, wherein when another plug-in application other than said plug-in application designated by the user is started, a button for displaying a screen in which said plug-in application designated by the user can be started is displayed on a screen for the other plug-in application.

17. A non-transitory computer readable medium encoded with an administration program for a plurality of image processing devices, the administration program being started when a plug-in application of said administration program is designated by a user, to cause a computer to execute processing comprising the steps of:
    acquiring information for specifying said plug-in application designated by the user;
    displaying a user interface for selecting the designated plug-in application such that said plug-in application designated by the user can be selected by the user;

accepting, from the user, selection of one of said plurality of image processing devices as a target of operation;

starting the selected plug-in application when the plug-in application is selected by said user; and providing, at the time of startup of said plug-in application, information of said selected device to the plug-in application being started, wherein when the user designates the plug-in application, the displaying step displays buttons related to the designated plug-in application in a home display area, and wherein the buttons displayed in the home display area represent less than all of the plug-in applications.

* * * * *